United States Patent [19]

Snavely, Jr. et al.

[11] 3,724,553

[45] Apr. 3, 1973

[54] PARAFFIN WELL TREATMENT METHOD

[75] Inventors: Earl S. Snavely, Jr., Arlington, Tex.; Theodore A. Bertness, Whittier, Calif.; Richard L. Morris, Dallas, Tex.

[73] Assignee: Mobil Oil Corporation, New York, N.Y.

[22] Filed: Nov. 18, 1971

[21] Appl. No.: 199,963

[52] U.S. Cl. ............166/304, 166/305 R, 252/8.55 B
[51] Int. Cl.......E21b 21/00, E21b 43/25, C09k 3/00
[58] Field of Search..........166/304, 305 R, 274, 273; 252/8.55 B, 8.55 D, 8.3; 137/15

[56] References Cited

UNITED STATES PATENTS

| 1,844,883 | 2/1932 | DeGroote........................166/304 X |
| 2,356,254 | 8/1944 | Lehmann, Jr. et al.........166/304 UX |
| 2,358,665 | 9/1944 | Shapiro..........................166/304 UX |
| 3,241,614 | 3/1966 | Bertness..............................166/304 |
| 3,375,192 | 3/1968 | Rowlinson......................166/304 X |
| 3,402,770 | 9/1968 | Messenger......................166/305 R |
| 3,437,146 | 4/1969 | Everhart et al..................166/304 X |
| 3,467,194 | 9/1969 | Kinney et al.....................166/305 R |
| 3,545,546 | 12/1970 | Surkalo et al.....................166/305 R |
| 3,563,315 | 2/1971 | Claytor, Jr. et al..................166/304 |

OTHER PUBLICATIONS

Cozzens, "Baths for Dirty Wells," The Oil Weekly, Vol. 117, No. 7, April 16, 1945, pp. 54 and 56.

*Primary Examiner*—Stephen J. Novosad
*Attorney*—Andrew L. Gaboriault et al.

[57] ABSTRACT

This specification discloses a method of treating a well having an oil column therein and penetrating an oil-containing subterranean formation to dissolve paraffin deposits from the well and the formation. There is injected into the well a thermally stable emulsion in a salt-free environment of a solvent for paraffins in a continuous aqueous phase. The emulsion is stable at the temperatures existing in the well and subterranean formation but subject to being broken by contacting the aqueous phase with salt. The emulsion has a greater specific gravity than the oil forming the oil column and settles downwardly therethrough to a lower location of the well. Salt having a greater specific gravity than the oil is injected into the well either prior to or subsequent to the injection of the emulsion into the well. The salt settles downwardly through the oil column to a lower location of the well and mixes with the emulsion, thereby breaking the emulsion and releasing the solvent to dissolve the paraffins.

14 Claims, 4 Drawing Figures

EARL S. SNAVELY, JR.
THEODORE A. BERTNESS
RICHARD L. MORRIS
INVENTORS

EARL S. SNAVELY, JR.
THEODORE A. BERTNESS
RICHARD L. MORRIS
INVENTORS

PARAFFIN WELL TREATMENT METHOD

BACKGROUND OF THE INVENTION

This invention relates to the treatment of a well and a subterranean petroleum-containing formation penetrated by the well. More particularly, this invention relates to the treatment of a well or subterranean formation to remove therefrom or prevent the forming therein of petroleum waxes commonly referred to as "paraffin deposits" or simply "paraffins."

In the production of certain types of petroleum or oil from subterranean formations penetrated by a well, paraffins are deposited from the oil and tend to clog the pores of the reservoir rock, well casing, perforations, screen and tubing through which the oil flows to the surface. Various techniques have been employed in the removal of these paraffin deposits from subsurface formations and wells penetrating such formations. These techniques include the use of mechanical and heating devices, explosives, and solvents. Various types of solvents which have been used to dissolve the paraffins include benzol (benzene), xylene, toluene, gasoline and heavier distillates, carbon tetrachloride, and carbon disulfide. These solvents have been run into wells through tubing, through the annulus formed between the well casing and tubing, and poured into the open casing and tubing. Solvents have also been lowered into wells in dump bailers. A principal problem in the use of solvents involves avoiding dilution of the solvents with oil while placing the solvents in a lower portion of the well where they are needed to dissolve the troublesome paraffins.

One of the most effective solvents for paraffins of different compositions is carbon disulfide. Use of carbon disulfide is difficult and hazardous however because it is extremely toxic, inflammable, and volatile. Carbon disulfide has a flash point of −22° F., an ignition temperature in air of 257° F., and a boiling point of 115.3° F. In addition, carbon disulfide is highly soluble in oil, thus making it difficult to place in concentrated form at a lower portion of a well having oil therein.

In U. S. Pat. No. 3,241,614 to Bertness, there is described a process of removing hydrocarbon accumulations from within a wellbore wherein the hydrocarbon accumulations are contacted with a liquid mixture comprising a solvent for hydrocarbons and a surfactant. Various hydrocarbon solvents, including carbon disulfide, may be employed in this mixture. In U. S. Pat. No. 3,375,192 to Rowlinson, there is described a mixture for use in cleaning oil wells. This mixture is made up of 84–92 percent by volume of carbon disulfide and 8–16 percent by volume of pentane. The pentane is added to the carbon disulfide to raise the ignition temperature of the carbon disulfide and thereby reduce the fire hazard of the same. In U. S. Pat. No. 3,402,770 to Messenger, there is disclosed a single-phase solvent which may be employed to dissolve flow-restricting materials from a well or from a subterranean formation. This solvent is comprised of a solution containing an organic solvent for oil and asphalt and a liquid having mutual solubility for oil and water. Carbon disulfide is cited as a preferred organic solvent for oil and asphalt.

In U. S. Pat. No. 2,358,665 to Shapiro there is described a method of removing wax deposits from oil well tubing by use of solvent emulsions which are adapted to break and release the solvent within a definite and narrow temperature range. The emulsions disclosed are immiscible with petroleum and by reason of their greater specific gravity sink through the oil column without change until they reach the temperature level at which they are adapted to break. On reaching this temperature level, the emulsions break and release the solvent in undiluted condition and the wax is thereby dissolved and caused to pass out of the tubing. The emulsions consist essentially of a wax bitumen solvent which must be heavier than and insoluble in water, a petroleum distillate such as the well-known rubber solvent and a small quantity of water. Carbon tetrachloride and carbon disulfide are mentioned above as examples of solvents for a mixture of wax and bitumen. These substances may be used singly or in admixture and may be wholly or in part substituted by other wax solvents, such as chlorinated hydrocarbons.

The method of Shapiro is difficult to employ in many wells. The emulsion must be formulated to break within a narrow temperature range about the temperature existing at the location of the paraffins. However, temperatures within this range may exist over a long interval of the well. Thus, the emulsion may break at some location distant from the most troublesome wax deposits as the emulsion settles downwardly through the oil column. Upon breaking, the solvents will be dissolved by the oil and lose their effectiveness for dissolving wax deposits in the well. Formulating an emulsion to ensure against premature breaking in the well involves the further risk that the emulsion will not break at the temperatures existing in the lower portion of the well. Such an emulsion of course is completely ineffective for dissolving wax deposits in the lower portion of a well.

SUMMARY OF THE INVENTION

This invention is directed to a method of treating a well to dissolve paraffin deposits therefrom which well has a substantially salt-free oil column therein and penetrates a subterranean formation. A thermally stable emulsion in a salt-free environment of a solvent for paraffins in a continuous aqueous phase is injected into the well. The emulsion has a greater specific gravity than the oil and settles downwardly through the oil column to a lower location of the well. Salt, having a greater specific gravity than the oil, is injected into the well and settles downwardly through the oil column to the lower location of the well where it mixes with the emulsion, thereby breaking the emulsion and releasing the solvent to dissolve the paraffins.

In an embodiment of this invention, the emulsion is stabilized by the inclusion therein of dioctyl sodium sulfosuccinate. In accordance with another embodiment, the solvent for paraffins is comprised of a mixture of an aromatic hydrocarbon solvent and carbon disulfide.

In accordance with still another embodiment there is injected via the well into the formation a thermally stable emulsion having a continuous aqueous phase. The emulsion is comprised of water, carbon disulfide, a hydrocarbon solvent, and an emulsion stabilizing agent in an amount sufficient to form an emulsion that is stable at a temperature at least as high as the highest temperature existing in the well. Thereafter, there is injected via the well into the formation an aqueous solution of salt which is mixed with the emulsion thereby breaking the emulsion and releasing the carbon disulfide and hydrocarbon solvent to dissolve the paraffin deposits.

DESCRIPTION OF THE PREFERRED EMBODIMENTS

Figure 1:
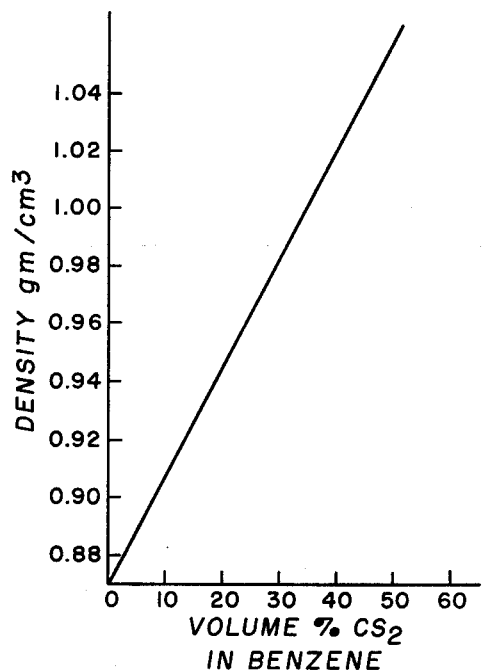
FIG. 1 is a plot of density versus volume percent of carbon disulfide in benzene.

This invention relates to treating a well that extends into the earth and that penetrates a subterranean oil-containing formation. More particularly, this invention relates to dissolving paraffin deposits in the well and the formation.

The method of this invention overcomes the difficulties of Shapiro of employing an emulsion which breaks in a narrow temperature range. The most troublesome paraffin deposits are normally located at a lower portion or bottom of the well. The present invention provides a method whereby a thermally stable emulsion is located at a lower portion or bottom of a well and contacted with salt which causes the emulsion to break.

In accordance with this invention, there is injected into a well that penetrates a subterranean formation and has a substantially salt-free oil column therein an emulsion of a solvent for paraffins in a continuous aqueous phase which emulsion is stable in a salt-free environment at temperatures at least as high as those existing in the well. The emulsion has a greater specific gravity than the oil and settles downwardly through the oil column to a lower location or bottom of the well. A salt which may be in granular form or in the form of an aqueous solution referred to as a "brine" and having a greater specific gravity than the oil is also injected into the well. The salt settles downwardly through the oil column to the lower location or bottom of the well and there mixes with the emulsion and causes the emulsion to break and release the solvent which is then available for dissolving paraffins.

In carrying out this invention, it is preferred that the thermally stable emulsion be injected into the well prior to the injection of the salt into the well. This ensures that the oil column through which the emulsion settles will be uncontaminated by any of the injected salt. However, normally the salt may be injected into the well first without seriously contaminating the oil column. Also, the salt may already be present at the lower portion of the well by reason of, for example, having previously settled from the oil, in which case the emulsion upon reaching the bottom of the well mixes with the salt and is broken. It is also preferred that the salt be injected into the well as an aqueous solution or brine. This facilitates the operational procedure of handling the salt. In addition, the emulsion and brine exhibit about the same settling rate through the oil column. Normally the emulsion and brine are spaced one from the other when injected into the well by a sufficient distance to ensure that they do not mix as they settle downwardly through the oil column until they arrive at the lower portion of the well where the paraffins are most troublesome. If desired, a buffer solution may be employed between the emulsion and brine to further ensure that mixing does not take place until they arrive at the lower portion of the well. A suitable buffer solution is water which may be treated, for example, by the addition of materials thereto to provide a specific gravity which corresponds with the specific gravity of the emulsion and brine.

In addition, the subterranean formation communicating with the well may be treated to dissolve paraffin deposits therefrom. In treating the formation the thermally stable emulsion and brine are injected by conventional techniques via the well into the formation where they are mixed to break the emulsion and release the solvent for paraffins to dissolve the paraffins. The dissolved paraffins may then be produced from the formation and well along with the oil production.

Suitable solvents for paraffin which may be employed in carrying out this invention include but are not limited to the following list of solvents.

Carbon disulfide
Benzene
Xylene
Tetralin
Turpentine
Diesel fuel.

Suitable stabilizing agents which may be employed in forming a thermally stable emulsion are the dioctyl sodium sulfosuccinates which are available under the trade name of "Aerosol GPG." A specific dioctyl sodium sulfosuccinate which may be used as a stabilizing agent is di(ethylhexyl) sodium sulfosuccinate which is available under the trade name of "Aerosol OT."

The chemical formula for dioctyl sodium sulfosuccinate is:

$$NaC_{20}H_{37}O_7S. \qquad (1)$$

The chemical formula for di(ethylhexyl) sodium sulfosuccinate is the same as that for dioctyl sodium sulfosuccinate, (1) above, and the structural formula is:

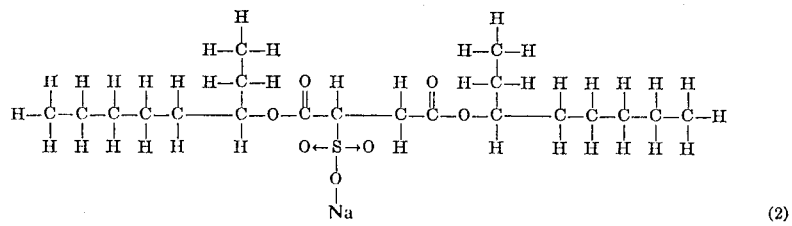

(2)

Any salt, inorganic or organic, which when mixed with the thermally stable emulsion will cause the emulsion to break may be employed. Simple tests can be carried out at the surface to determine the suitability of any particular salt and to determine the amounts required of such salts for breaking the emulsion. Inorganic salts of the alkali metal and ammonium groups and the alkaline-earth metal groups are preferred because they are soluble in water and readily available. Thus the alkali metal and ammonium halides and the alkaline-earth metal halides may be employed in carrying out this invention. Sodium chloride is a particularly preferred salt for use in carrying out this invention because of its availability in most oil fields and because it can be injected into subsurface formations without any risk of forming insoluble precipitants therein which might damage the formations.

Carbon disulfide is one of the best universal solvents for paraffin deposits and is a preferred solvent to use in the emulsion. A thermally stable emulsion of carbon disulfide in water without the inclusion therewith of other solvents for paraffins may be used in wells having a temperature of less than about 150° F. However, for those wells wherein the temperature is greater than about 150° F., it is desirable to include with the carbon disulfide another less volatile solvent for paraffins in order to keep the vapor pressure of the mixture sufficiently low that a thermally stable emulsion can be formed. Hydrocarbon solvents and in particular aromatic hydrocarbon solvents have been found to give good results when mixed with carbon disulfide.

The amount of solvents for paraffins to be emulsified in water and employed in treating a well may readily be determined based upon the amount of paraffins to be dissolved and the dissolving ability of the solvents for paraffins. For treatment of most wells, a volume of from 1 to 10 barrels of emulsion is sufficient. Salt in an amount of about at least 1 pound for every 10 gallons of emulsion is normally sufficient to break the emulsion when injected into the well. If the salt is dissolved in water to form a brine, then the volume of brine injected into the well is desirably about at least one-tenth of the volume of emulsion that is injected into the well.

A typical thermally stable emulsion employed in carrying out this invention is comprised of water, a hydrocarbon solvent, carbon disulfide and a stabilizing agent. In this typical emulsion the amount of water employed is about 13.4 percent by volume of the emulsion, the combined amounts of hydrocarbon solvent and carbon disulfide employed is about 86.6 percent by volume of the emulsion and the amount of the stabilizing agent is that amount which is sufficient to form an emulsion which is thermally stable in the absence of salt at temperatures at least as high as the highest temperature existing in the well. Dioctyl sodium sulfosuccinate employed in an amount of 0.13 gram per 100 cc's of emulsion will stabilize such an emulsion at temperatures up to 180° F. and when employed in an amount of 0.17 gram per 100 cc's of emulsion will stabilize such an emulsion at temperatures up to 250° F.

A specific emulsion which is thermally stable at temperatures higher than 200° F. and which may be employed in carrying out this invention is comprised of 5.5 parts by volume (11.5 volume percent) of carbon disulfide, 34.5 parts by volume (72.3 volume percent) of tetralin, 7.7 parts by volume (16.2 volume percent) of water, and 1.3 weight percent (based on water) of dioctyl sodium sulfosuccinate. This emulsion may be injected into a well and followed with 1 gallon of 10 percent salt water for each barrel of emulsion injected. Upon mixing of the emulsion and salt water at the lower portion of the well, the emulsion is broken, thereby releasing the active components for dissolving the paraffin deposits.

Another specific emulsion which may be used to provide a higher density solvent that will dissolve paraffins faster is comprised of 25 parts by volume (43.3 volume percent) of carbon disulfide, 25 parts by volume (43.3 volume percent) of tetralin, 7.7 parts by volume (13.4 volume percent) of water, and 1.3 weight percent (based on water) of dioctyl sodium sulfosuccinate. This emulsion is also thermally stable at temperatures exceeding 200° F., but may also be broken by contact with salt water.

It is preferred that in the thermally stable emulsion the specific gravity of the solvent phase be approximately equal to the specific gravity of the aqueous phase. This reduces the tendency of the emulsion to separate under the force of gravity. Such an emulsion is particularly desirable where it is to be stored for long periods of time prior to use.

Figure 2:
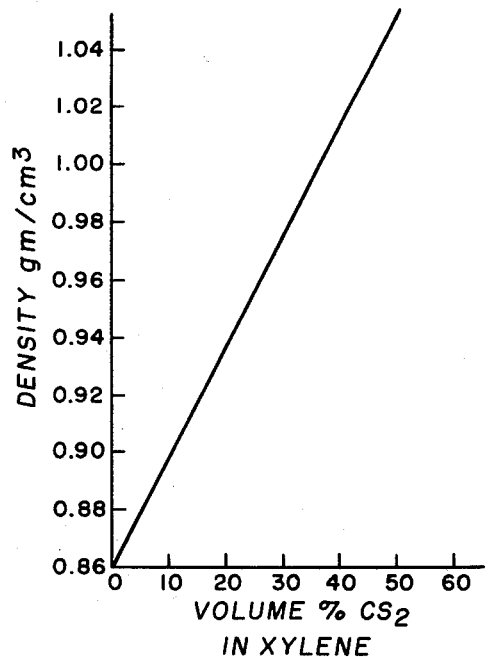
FIG. 2 is a plot of density versus volume percent of carbon disulfide in xylene.
Figure 3:
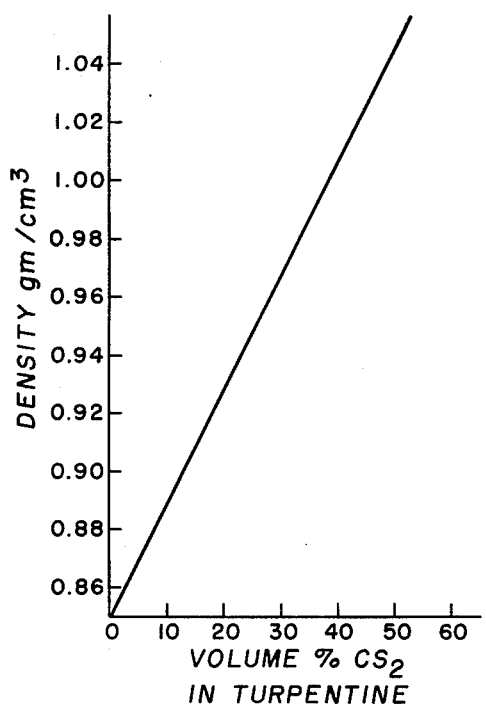
FIG. 3 is a plot of density versus volume percent of carbon disulfide in turpentine.
Figure 4:
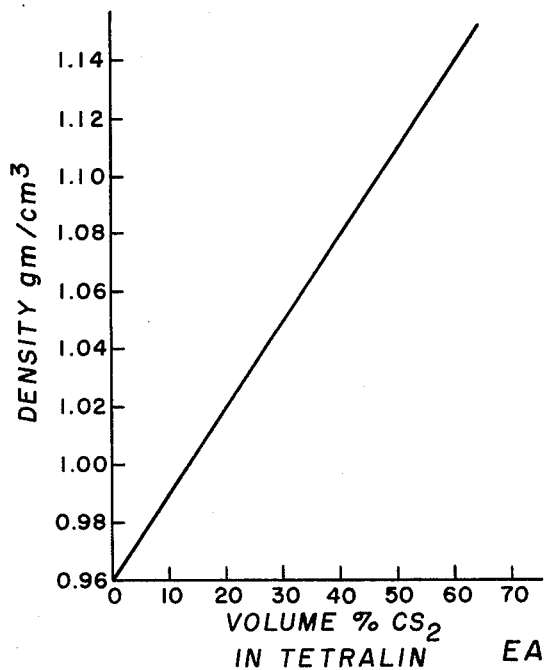
FIG. 4 is a plot of density versus volume percent of carbon disulfide in tetralin.

FIGS. 1–4 are provided to facilitate the selecting of the amounts of carbon disulfide and other solvents for paraffins for forming a solvent phase having a desired density. FIG. 1 is a plot of the density of a solution of carbon disulfide in benzene at 73° F. wherein the abscissa is volume percent of carbon disulfide in a benzene carbon disulfide mixture and the ordinate is density in grams in cubic centimeters. FIG. 2 is a plot of the density of a solution of carbon disulfide in xylene at 73° F. wherein the abscissa is volume percent of carbon disulfide in a xylene carbon disulfide mixture and the ordinate is density in grams per cubic centimeters. FIG. 3 is a like plot of carbon disulfide in turpentine, and FIG. 4 is a like plot of carbon disulfide in tetralin. From these plots the relative amounts of carbon disulfide and specific hydrocarbon solvents can be readily determined for forming a solvent phase of desired density.

We claim:

1. A method of treating a well penetrating a subterranean formation and having a substantially salt-free oil column therein and paraffin deposits at a lower location thereof, comprising:
   injecting into said well a thermally stable emulsion in a salt-free environment of a solvent for paraffins in a continuous aqueous phase, said emulsion having a greater specific gravity than the oil forming said oil column whereby said emulsion settles downwardly through said oil column to a lower location of said well; and
   injecting into said well salt having a greater specific gravity than said oil, whereby said salt settles downwardly through said oil column to a lower location of said well and mixes with said emulsion thereby breaking said emulsion and releasing said solvent for paraffins to dissolve said paraffins.

2. The method of claim 1 wherein said emulsion includes dioctyl sodium sulfosuccinate as a stabilizing agent.

3. The method of claim 2 wherein said emulsion stabilizing agent is di(ethylhexyl) sodium sulfosuccinate.

4. The method of claim 1 wherein said solvent for paraffins is comprised of carbon disulfide.

5. The method of claim 4 wherein said solvent for paraffins is comprised of a mixture of carbon disulfide and a less volatile solvent for paraffins.

6. The method of claim 5 wherein said less volatile solvent for paraffins is a hydrocarbon.

7. The method of claim 6 wherein said hydrocarbon is an aromatic hydrocarbon.

8. The method of claim 5 wherein the specific gravity of said solvent for paraffins is approximately equal to the specific gravity of said aqueous phase.

9. The method of claim 1 wherein said salt is selected from the group consisting of the alkali metal and ammonium groups and the alkaline-earth metal group.

10. The method of claim 9 wherein an aqueous solution of said salt is injected into said well.

11. A method of treating a well penetrating a subterranean formation to dissolve paraffin deposits therefrom, said well having a substantially salt-free oil column therein, comprising:

injecting into said well a thermally stable emulsion having a continuous aqueous phase, said emulsion being comprised of water, a hydrocarbon solvent, carbon disulfide, and an emulsion stabilizing agent, said water being present in an amount of about 13.4 percent by volume of said emulsion, said hydrocarbon solvent and said carbon disulfide being present in a combined amount of about 86.6 percent by volume of said emulsion, and said emulsion stabilizing agent being present in an amount sufficient to stabilize said emulsion in a salt-free environment at a temperature at least as high as the highest temperature of said well, said emulsion having a greater specific gravity than said oil whereby said emulsion settles downwardly through said oil column to a lower location of said well; and injecting into said well an aqueous solution of salt having a greater specific gravity than said oil, whereby said aqueous solution of salt settles downwardly through said oil column to a lower location of said well and mixes with said emulsion thereby breaking said emulsion and releasing said carbon disulfide and hydrocarbon solvent to dissolve said paraffins.

12. The method of claim 11 wherein said emulsion stabilizing agent is dioctyl sodium sulfosuccinate.

13. The method of claim 12 wherein said salt is selected from the group consisting of the alkali metal and ammonium groups and the alkaline-earth metal group.

14. A method of treating a subterranean formation penetrated by a well to remove paraffin deposits therefrom comprising:

injecting via said well into said formation an emulsion having a continuous aqueous phase, said emulsion being comprised of water, a mixture of carbon disulfide and a less volatile solvent for paraffins, and dioctyl sodium sulfosuccinate as a stabilizing agent to form an emulsion that is thermally stable in a salt-free environment at a temperature at least as high as the highest temperature of said well; and injecting via said well into said formation an aqueous solution of salt to mix with and break said emulsion thereby releasing said mixture of carbon disulfide and less volatile solvent for paraffins to dissolve said paraffin deposits.

* * * * *